Sept. 1, 1931.  W. S. NEIGHBOUR  1,821,113
MOUNTING FOR ROTARY MITER SAWS
Filed Oct. 31, 1928   3 Sheets-Sheet 1
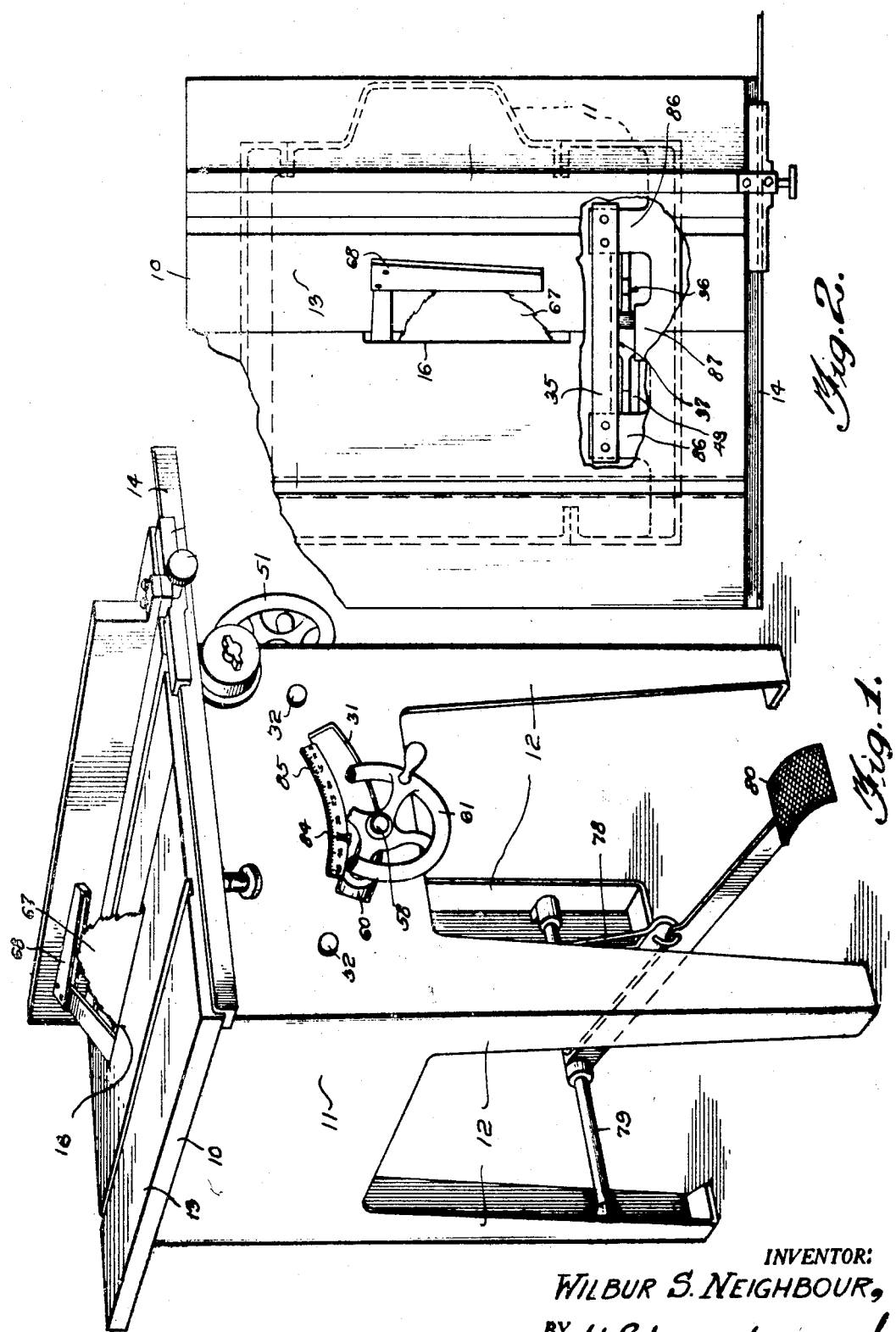
INVENTOR:
WILBUR S. NEIGHBOUR,
BY H S Woodward
ATTORNEY.

INVENTOR:
WILBUR S. NEIGHBOUR
BY H. S. Woodward
ATTORNEY.

Sept. 1, 1931.  W. S. NEIGHBOUR  1,821,113
MOUNTING FOR ROTARY MITER SAWS
Filed Oct. 31, 1928   3 Sheets-Sheet 3

INVENTOR:
W. S. NEIGHBOUR,
By H. L. Woodward
ATTORNEY.

Patented Sept. 1, 1931

1,821,113

UNITED STATES PATENT OFFICE

WILBUR S. NEIGHBOUR, OF HACKETTSTOWN, NEW JERSEY, ASSIGNOR TO AMERICAN SAW MILL MACHINERY COMPANY, OF HACKETTSTOWN, NEW JERSEY, A CORPORATION OF NEW JERSEY

MOUNTING FOR ROTARY MITER SAWS

Application filed October 31, 1928. Serial No. 316,170.

The invention relates to an improved mounting to enable and secure tilting of a table saw into various planes for mitering, as disclosed in my copending application of even date, Serial No. 316,169 and at the same time attain a sturdy structure which will be liable in a minimum degree to impairment by long continued use, heavy work and inexpert manipulation or operation. It is an object of the invention to present a novel and commercially more desirable and practical table saw of this character.

The means for swinging the saw and motor frame disclosed here are claimed in my copending application of even date, Serial Number 316,169.

It has long been sought to evolve a tiltable table saw, and some forms of such an appliance have been perfected. In such an appliance it has universally been recognized that a means for raising and lowering the saw is essential to its satisfactory use. It has been an objection of such prior devices that they have either involved objectionable complications in the mounting, or it has been such as to preclude or prevent translative movement of the saw in its plane. It is therefore an object of this invention to present a mounting of great simplicity, in which the saw may be tilted as desired and will readily remain in the various tilted positions without inherent tendency to move otherwise, will require little power for its tilting movements and will not be liable to derangement of movement or adjustment materially because of wear of parts.

It is particularly an important object to enable the utilization of an electric motor having the saw mounted directly on the shaft thereof in a tiltable table saw so that the full adjustment necessary for practical carpentry and joinery may be readily secured without excessive size or thickness in the saw, or peculiar shaping of the table or complication of other parts.

It is an aim of the invention to provide a novel construction in the several parts necessary to the attainment of the function desired, particularly in the main mounting of the saw assembly to the end that a saw projected through a work-table may be adjusted in various planes by movement upon an intangible or projected axis coincident with the top plane of the work-table. A further aim of this nature is the improvement of the operative connections by which the saw is moved from below the table in any plane in which it is set, for cutting action; to the end that extreme accuracy may be secured and also a rapid cut effected. A further aim is the improvement of construction by which a saw and motor are mounted to swing for the making of the projected cut. An additional aim is the improvement of the mounting of a motor and saw as a unit in a table in such manner that they may be tilted variously, sufficiently for the various angular cuts required in carpentry and joining.

Additional objects, advantages and features of invention reside in the construction, arrangement and combination of parts as will be understood from the accompanying description and drawings, wherein, Figure 1 is a perspective view of a saw bench constructed in accordance with my invention.

Figure 2 is a top view thereof with a portion broken away.

Figure 3:
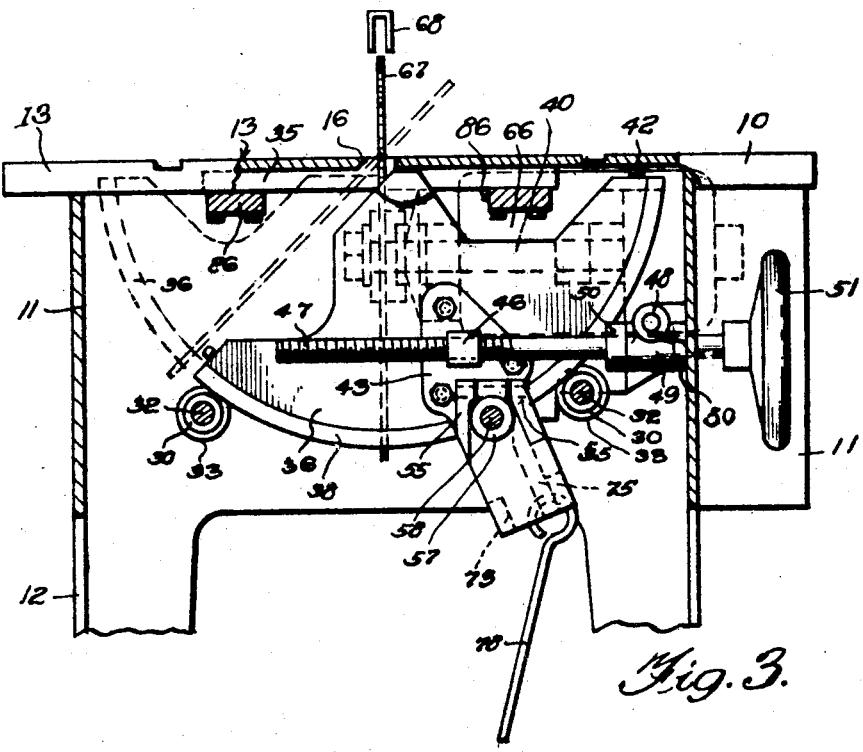
Figure 3 is a front view with the side of the frame removed.
Figure 4:
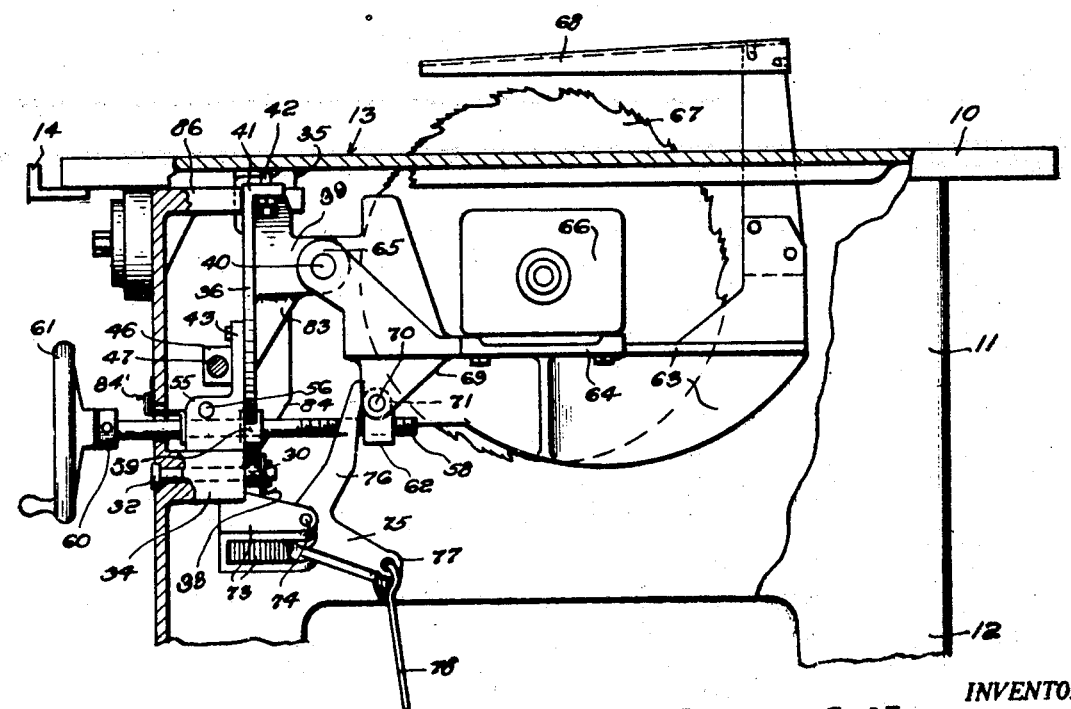
Figure 4 is a side elevation partly in section.
Figure 5:
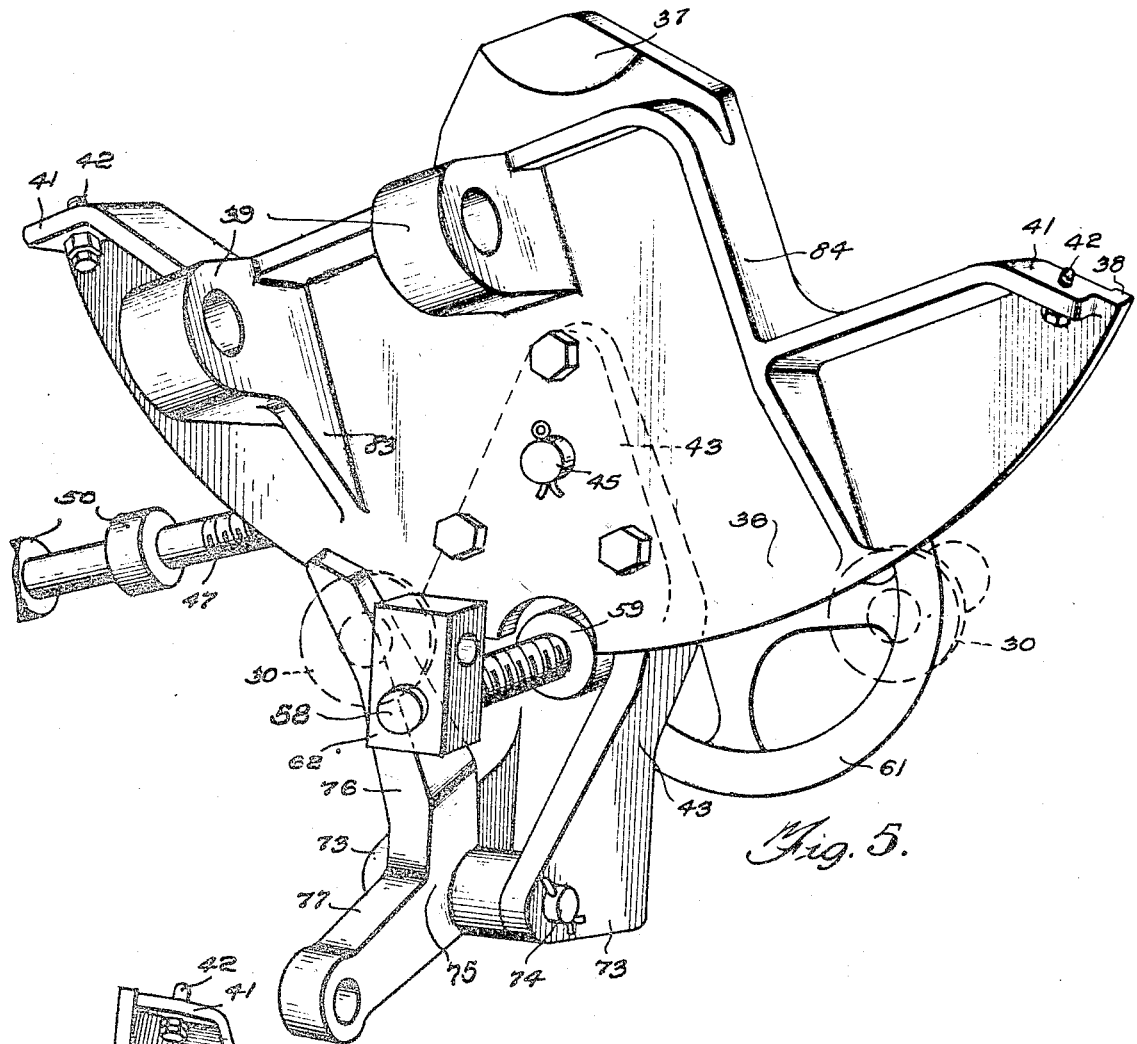
Figure 5 is a perspective view of the quadrant from the rear and right hand side with the swing removed.
Figure 6:
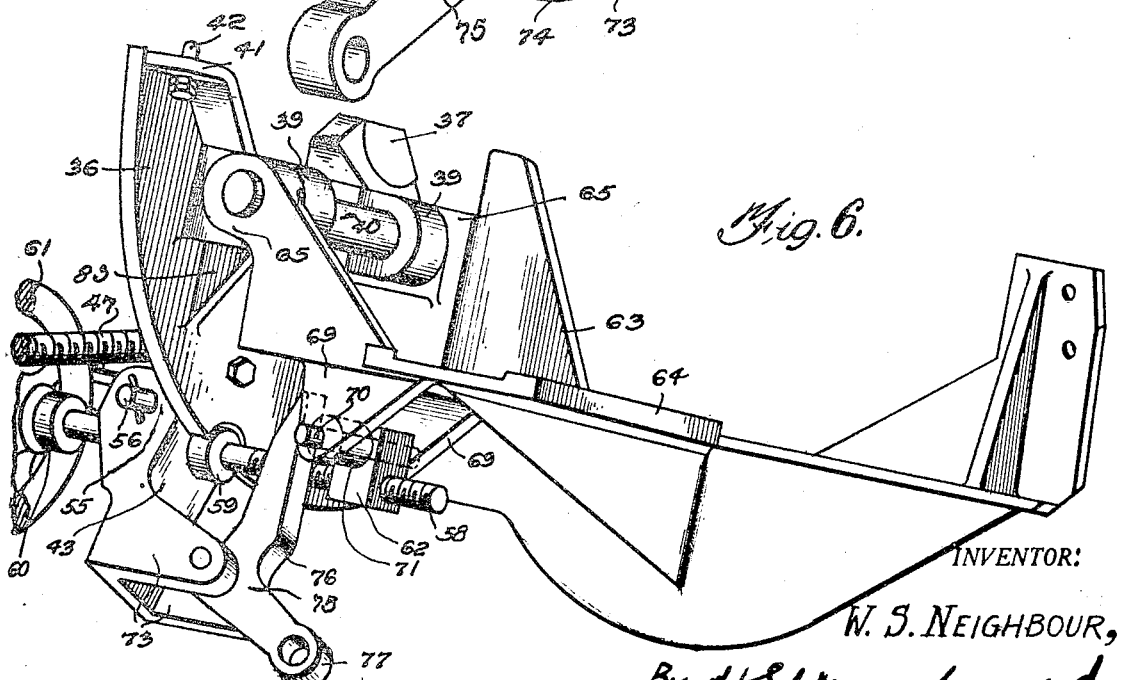
Figure 6 is a similar view from the rear and left with the swing in place.

There is illustrated a table 10 comprising a rectangular frame 11, cast in parts and having four legs 12. A table top proper 13 is secured or formed integrally upon the top of the frame projecting at the sides as desired. A slot 16 is formed in the top 13 bevelled downward on the left-hand side at least.

It is an interesting and important fact to consider that, except for a sleeve pivoted at the side of the frame and affording a bearing for a tilting screw, and a shaft for a pedal, there are no fastening connections between the mechanism of this appliance and the frame 11. Two rollers 30 revolubly mounted in a common plane upon the front vertical plate portion or side of the frame comprise the support for the entire mechanism. These rollers are at the same level, and are spaced equally from a vertical plane medially of the saw slot 16. A curved slot 31 is formed through the front plate of the frame, concentric with an axis medially over the saw slot 16 and coincident with the plane of the upper surface of the table top. The rollers 30 are mounted upon suitable pins 32 fixed in the front plate of the frame. These rollers are formed with flanges 33 at their inner or rear sides, and forwardly of these flanges are cylindrical abutting snugly respective bearing bosses 34 extending above the rollers for a purpose to be explained. The rollers 30 are held upon the pins 32 by means of cotter pins in the present instance. Under the table top 13, in line with the slot 16 and between the forward end of the slot and the vertical plane of the rollers 30 there is mounted a bar 35, having a smoothly finished forward vertical bearing face. A quadrant plate 36 is provided, having an upper bearing face portion 37 adapted to rest against the front face of the bar 35 and a lower curved edge machined or ground to travel upon the rollers 32, and when so positioned it is concentric with the before-mentioned projected axis centrally over the saw slot, and the top portion 37 of the quadrant stops short of the under side of the table top. The quadrant is also formed with a rail edge 38 on its front side immediately adjacent its perimeter adapted to rest slidably against the bearing bosses 34. The quadrant at its periphery and with respect to its projected axis includes an angle of something more than ninety degrees. It has an initial position when considered from the front, in which its major portion is at the right of its axis, and has an extent of movement toward the left upon the rollers through an arc of 45 degrees or more. Upon the rear side of the quadrant there are formed two heavy ears 39, carrying a shaft 40, horizontal in initial position as described. It is also parallel to the plane of movement of the quadrant upon the rollers and at the right of the axis of the segment, as well as a distance below the table top. The quadrant is suitably stiffened by flanges, including a flange portion 41 adjacent its perimeter at each extreme through which set screws 42 are engaged to strike the under side of the table top when the quadrant is at either limit of movement on the rollers 30. The initial position corresponds to the vertical position of the saw of the machine, as will be subsequently explained. At the front side of the quadrant there is bolted a bracket plate 43 which projects a distance downwardly from the quadrant, this plate being located immediately inward of the right hand roller 30 when the quadrant is in initial position, and being of such width as to permit movement of the quadrant through an angle of 45 degrees without engaging the left-hand roller or bearing. Revolubly engaged through the bracket 43 and through the body of the quadrant to obtain a good bearing there is a revoluble shaft 45 having a nut head 46 interiorly threaded and having engaged therein the tilting screw 47 which is extended in a line parallel to the plane of the quadrant through a suitable opening in the right hand side of the frame 11. Immediately above this opening and upon the inner side of the frame there are formed integral ears 48 between which there is pivoted a lateral ear of a bearing sleeve 49 in which the outer part of the screw is journalled, thrust collars 50 being fixed upon the screw shaft at each side of the sleeve, while upon the outer extremity of the screw a suitable handwheel 51 is provided for its operation. The shaft 45 is located as closely as practicable to the perimeter of the quadrant, having consideration for elements now to be described. Upon its front side the bracket plate is formed with two initially vertical ears 55, carrying a horizontal pin 56 upon which there is pivoted a depending bearing sleeve 57 in which there is revoluble and slidable a raising screw 58. The raising screw 58 is slidable in the sleeve 57, and provided with an inner thrust collar 59, and an outer stop collar 60, both adapted to engage the bearing sleeve, one to sustain the thrust on the screw when sustaining the weight of the saw parts, the other to limit inward movement of the screw and saw when moved in independent raising of the saw. A handwheel 61 is fixed on the outer end of the screw 58. The inner threaded portion of the screw 58 is engaged in a nut block 62 connected to a saw swing 63 which is pivoted upon the shaft 40, as will be described. The swing comprises a planiform bed plate 64 at the inner end of which upwardly extending parts provide ears 65 which are pivoted on the projecting ends of the shaft 40 beyond the ears 39. The plate 64 is suitably shaped for mounting of an electric motor 66 having its arbor parallel to the shaft 40. Upon the arbor a saw 67 is fixed in a plane coincident with the axis of the quadrant 37. At the inner part of the swing two depending ears 69 are formed, carrying a shaft 70 upon which the nut block 62 is revolubly mounted. The block extends below the shaft and is suitably bored and threaded to receive the raising screw 58 as before mentioned. The ears 69 are spaced so as to admit a wiper roller 71 mounted upon the shaft 70 and engaged by a foot-operated lifting cam 75, as will be described.

As before stated, the ears 55 are vertical and the pin 56 horizontal when the parts are in initial position for vertical cuts with the saw. The lower projecting portion of the bracket plate 53 is provided at its lower part with rearwardly projecting ears 73 bearing therebetween a pintle 74 at right angles to the direction of extension of the bracket plate. Upon the pintle between the ears there is pivoted a bell-crank cam device 75 having an upwardly extending arm 76. The lower arm 77 of the bell-crank is inclined upwardly when the device is in initial position, and has connected thereto a pedal link 78 extended to the pedal 80, which is pivotally mounted on the shaft 79 between two rear legs of the frame. It may be observed that the motor field cores and frame are so shaped and arranged that the parts above the armature when the device is in initial position lie only slightly above the periphery of the armature, thus permitting the operation of such a saw directly on the arbor of the motor without requiring an excessive diameter in the saw in order to project through the saw slot 16.

It is also to be noted that the saw is at the left-hand end of the motor arbor, which in coordination with the arrangement of the swing supporting ears 39 with respect to the medial radius of the quadrant, the location of the bracket plate 53 and arrangement of parts thereon, enables the tilting of the saw and motor unit through all necessary angles involved in ordinary joinery, through a simple planiform table top without sacrificing efficiency. With the parts in initial position, two of the vertical stiffening ribs 83—84 of the quadrant are alined with the points at which the quadrant rests upon the rollers 30 and engages the bearings, giving the device a maximum rigidity for heavy cross-cut service, which is apt to involve most severe usage of the appliance. That is to say, fine mitering work will ordinarily be done by workmen who exercise care in feeding the work to a saw, but simple cross-cuts are very often made by less experienced persons who attempt to force the work and subject the appliance to excessive strain, requiring great ruggedness and rigidity. In addition, thicker and heavier timbers will ordinarily be involved in simple cross cuts ordinarily. One of the ears 54 is extended beside the raising screw 58 close to the slot 31, and a pointer 84 is mounted thereon projected outwardly through the slot and turned upwardly. A sector shaped dial 85 is fixed on the front face of the frame beside the slot 31, the angle at which the saw is disposed with respect to the plane of the table top at the various positions of the quadrant being indicated on the dial by the pointer.

The manner of use of the machine will be readily understood by those versed in the art from the nature of the construction and arrangement of the parts as described, it being sufficient to state that the adjustment of the saw either to vertical plane or in such variously inclined planes as desired is accomplished merely by operation of the handwheel 51, the movement of the saw from an initial position below the slot 16 to a maximum projection therethrough is secured by the handwheel 61 or the pedal 80, or both together.

The wheel 51 acts through the screw 50 upon the shaft 45 to rotate the quadrant 36 on the rollers 30. The wheel 61 operates by the screw 58 and nut block 62 on the shaft 70 to press the lower part of the swing 63 rearwardly, raising the saw or to permit it to move downwardly, the thrust on the screw in such operations being sustained by the collar 59 against the pivoted bearing sleeve 57 on the quadrant. At any stage of movement of the swing by the screw, if the pedal 80 is depressed, the cam 76 will be moved into engagement with the wiper roller 71 and thereby move the swing independently in accordance with the extent of movement of the pedal. When moved by the pedal from initial position the collar 60 will act as a stop. Whenever pressure is removed from the pedal, the saw will return to the initial position at which operation of the pedal was begun, by gravity acting on the swing and parts carried thereby.

The particular construction and arrangement in the mounting and form of the quadrant are particularly valuable in such an appliance by reason of the fact that the portion of the saw alined with the top of the frame of the table does not change its location when a change of inclination is made, the saw moving for such tilting upon an axis immediately at the table top, so that many complications and difficulties are avoided which would be involved if the axis of tilting movement were below or above the table top. The bar 35 is mounted on two rearward extensions or arms 86 from the front side of the frame 11, being held by dowels or bolts for quick removal. The left hand side of the table top is separate from the right hand side, the two meeting in line with the right hand side of the slot 16, and is slidable to the left to clear the parts thereunder. It is secured in operative position by the hand nut or screw 15 which clamps the angle bar 14 to the movable piece of the top. This permits ready access to the assembly below the top. By removal of the bar 35, disengagement of the screws 47 and 58 from the nuts 46 and 62, and disconnection of the link 78, the complete mechanism may be removed by simply lifting it off the rollers 30 and passing it downward and laterally from within the frame 11.

The parts carried by the quadrant plate 36 are so predominantly to the rear thereof, and the load on the swing such a distance rearwardly that the quadrant is held in operative position with great security by the force of gravity. It bears rearwardly at the top against the bar 35, and presses forwardly against the blocks 34 at the lower part while being at the same time sustained on the rollers 30. In addition to the weight of the parts, all stresses incident to cutting operations of the saw contribute further resultant forces of the same effect. Only rarely, in use—and then as a result of improper manipulation or accident—will the quadrant tend to press forwardly at the top, and at such time the member 87 will prevent material movement of that kind. This member is,—like the arms 86—an integral extension from the front piece of the frame 11, on a level with the bar 35 and faced to properly engage the top of the quadrant opposite the face 37.

I claim:

1. In a device of the character described, a tiltable tool appliance comprising a frame, a base member of substantial height having a rail at its lower part in the form of a segment of a circle, slidably mounted on the frame and having an upper medial part stopping short of but near the axis of the circle and formed with a bearing face presented laterally with respect to its path of movement, said frame having an opposed bearing face engaging therewith, a tool swingingly mounted on the said base member at the side next said bearing faces in a plane coincident with said axis, means to drive the tool, means to swing the tool, means to move the base member on said axis and means to fix the base member in its adjustment around said axis.

2. A device of the character described comprising a frame, a table top thereon, a plurality of rollers mounted thereon in a common plane, a base body having an edge concentric with a given axis, said edge resting upon the rollers, said top having a lateral bearing face adjacent the axis of the body, said body having a face engaging the said bearing face at the rear side of the body, bearing faces for the front edge portion of the body at its lower periphery, means to move the body concentrically and secure it in adjusted positions, a motor bed plate pivoted on the rear side of the base body on an axis parallel to the path of the body and at right angles to a medial radial plane of the body, an electric motor on said bed plate having an arbor projecting therefrom at right angles to said plane, a saw fixed on the shaft coincident with said plane, and means coactive between the base body and bed plate to swing the bed plate on its pivot.

3. A device of the character described comprising a frame, a plurality of rollers in a single plane thereon, a body having a concentric curved edge resting upon the rollers for concentric sliding movement thereon, a bearing face on the frame on a line at right angles to the plane of, and medially over, the rollers, and below but adjacent the projected axis of the said curved edge; said body resting by gravity against said bearing face, means to sustain the body laterally at its curved edge opposite the said bearing face, means to move the body on the rollers and secure it in adjusted positions, a rotary saw mounted on said body at the side next to said first named bearing face to swing in a plane coincident with said projected axis, means to drive the saw, means to swing the saw, and a work-holding means on the upper part of the frame.

4. A machine of the character described, consisting of a frame, a base body plate mounted thereon to rotate on a horizontal axis, the body having a front and rear side, a bearing face on the frame at the rear side of the body at the upper part, bearing faces on the frame at the front side of the body at its lower part, said bearing faces engaging the body slidably, the lower bearing faces being of greater extent circumferentially of the path of the body, means to support the body vertically, a saw unit swingingly mounted on the rear side of the body, saw driving means, means to adjust the body by movement around said horizontal axis and means coactive between the plate and saw unit to swing the latter.

5. A machine of the character described, consisting of a frame, a base body plate mounted thereon to rotate on a horizontal axis, the body having a front and rear side, a bearing face on the frame at the rear side of the body at the upper part, bearing faces on the frame at the front side of the body at its lower part said bearing faces engaging the body slidably, the lower bearing faces being of greater extent circumferentially of the path of the body, means to support the body vertically, said body having a shaft carried thereon parallel to the plane of movement of the body, a motor bed plate having forwardly and upwardly extending parts pivoted on said shaft, a motor mounted on the bed plate having an arbor parallel to said shaft and projecting at one side at right angles to a radial plane of said axis, a saw fixed on the arbor in said plane, means to swing the bed plate on its pivotal axis, means to adjust the base body in its movement on said first named axis, and work holding means on the frame.

6. The structure of claim 5 in which the said bearing faces at the front side of the body are below the said shaft when in initial position for vertical cuts, and stiffening webs on said plate including two alined with an extending from adjacent the last mentioned bearing faces to the mountings of said shaft on the plate and said upper bearing face on the frame.

In testimony whereof I affix my signature.

WILBUR S. NEIGHBOUR.